United States Patent [19]

Silvestrini

[11] 4,170,660
[45] Oct. 9, 1979

[54] METHOD FOR PITTING PEACHES

[75] Inventor: Jesus A. Silvestrini, Godoy Cruz, Argentina

[73] Assignee: California Processing Machinery, San Ramon, Calif.

[21] Appl. No.: 901,443

[22] Filed: May 1, 1978

Related U.S. Application Data

[62] Division of Ser. No. 639,706, Dec. 11, 1975, Pat. No. 4,109,570.

[30] Foreign Application Priority Data

Aug. 14, 1975 [AR] Argentina ............... 260021

[51] Int. Cl.² ............................................. A23N 4/22
[52] U.S. Cl. ................................................ 426/485
[58] Field of Search ............... 99/548, 552, 562, 563, 99/551, 554; 426/484, 482, 485

[56] References Cited

U.S. PATENT DOCUMENTS

| Re. 17,726 | 7/1930 | Duncan | 99/551 |
|---|---|---|---|
| 1,357,004 | 10/1920 | Robbins | 99/548 |
| 1,387,183 | 8/1921 | Robbins | 99/563 |
| 1,448,472 | 3/1923 | Thompson | 99/563 |
| 2,443,863 | 6/1948 | Lindley, Jr. | 99/562 |
| 2,518,274 | 8/1950 | Besag | 99/563 |
| 2,565,165 | 8/1951 | Besag et al. | 99/563 |
| 2,664,127 | 12/1953 | Perrelli | 99/561 |
| 2,775,279 | 12/1956 | Perrelli | 99/551 |
| 2,826,227 | 3/1958 | Perrelli | 99/551 |
| 2,826,228 | 3/1958 | Perrelli et al. | 99/584 |
| 2,967,554 | 1/1961 | Waters | 99/551 |
| 3,003,529 | 10/1961 | Creed | 99/551 |
| 3,016,935 | 1/1962 | Newburn | |
| 3,035,620 | 5/1962 | Drake | 99/551 |
| 3,045,732 | 7/1962 | Vadis | |

Primary Examiner—S. Leon Bashore
Assistant Examiner—Steve Alvo
Attorney, Agent, or Firm—Limbach, Limbach & Sutton

[57] ABSTRACT

Method for pitting peaches using a machine which receives a peach by partially cutting it and gripping the stone and while then rotating the peach through a circle engages the peach halves by resilient pneumatic grippers which adapt to the surface of the peach halves. After rotation through a predetermined angle in the cycle, the grippers rotate in opposite directions to separate the peach halves from the stone and, therefore, release the peach halves and the stone.

7 Claims, 4 Drawing Figures

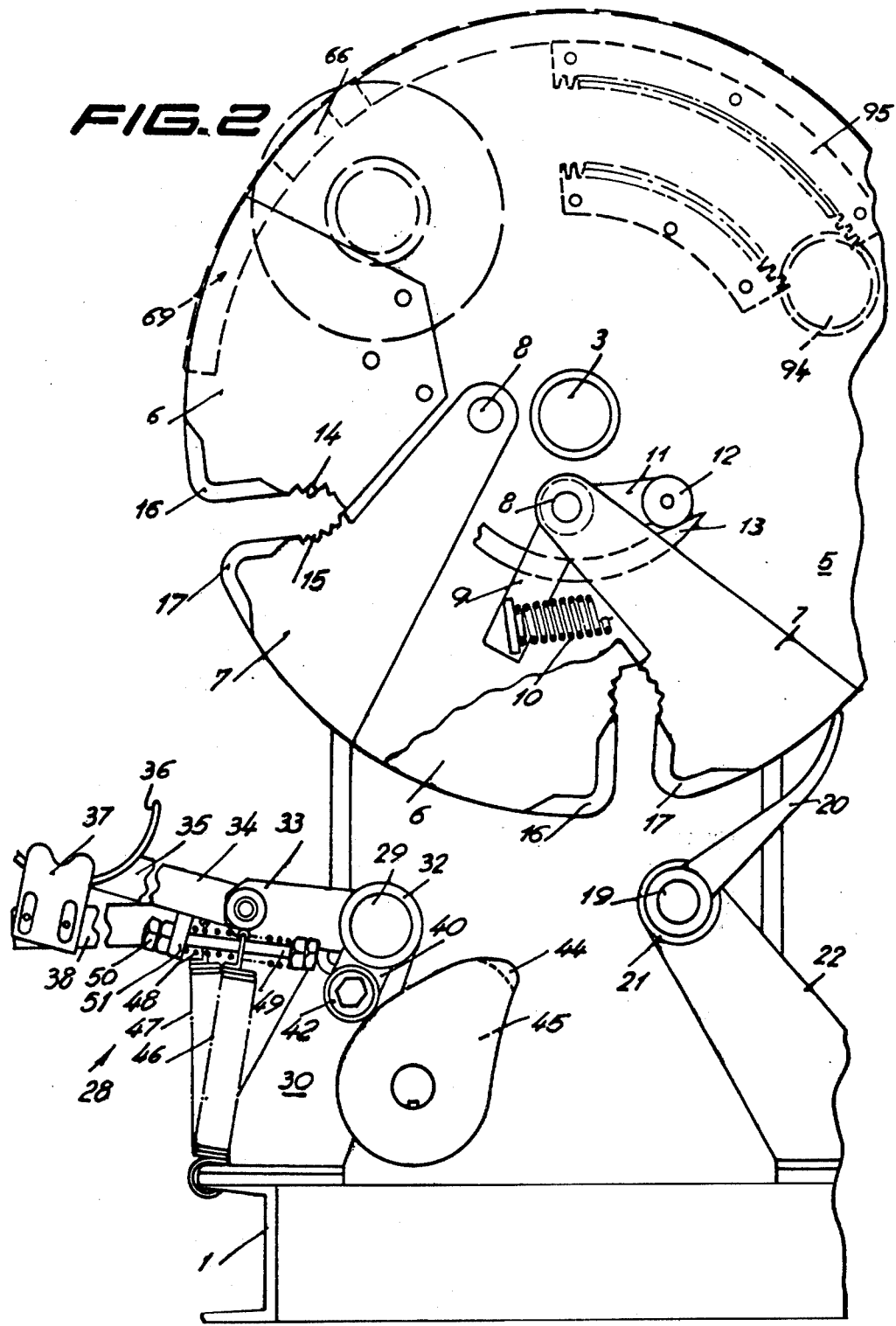

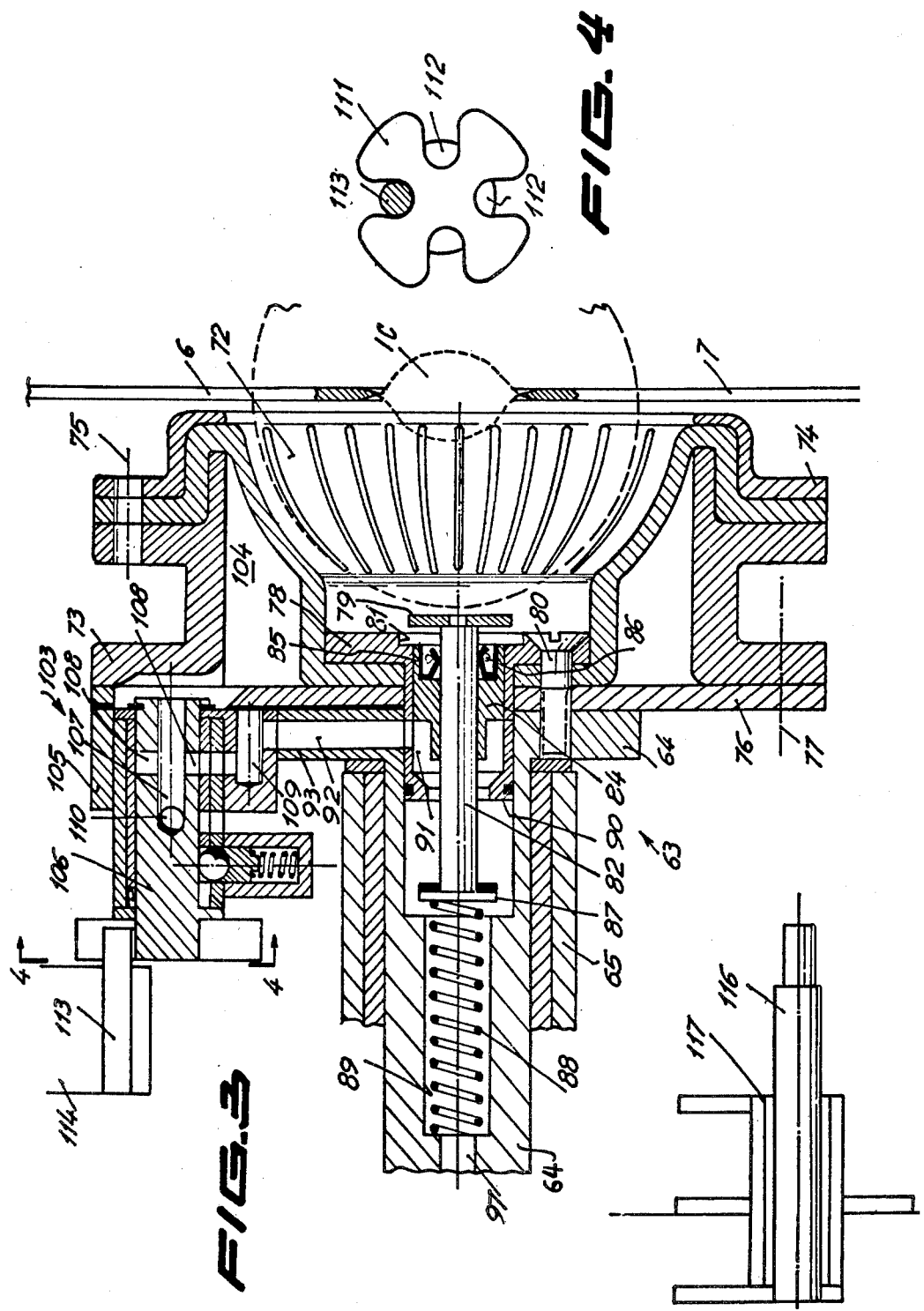

METHOD FOR PITTING PEACHES

This is a division of application Ser. No. 639,706, filed Dec. 11, 1975, now U.S. Pat. No. 4,109,570.

BACKGROUND OF THE INVENTION

The present invention relates to a method and apparatus for pitting peaches, especially cling peaches.

Most methods and machines previously known for this purpose generally have utilized blades or cutters to separate the stone from the fruit pulp or flesh. Other known methods and machines do not use blades or cutters and rely on causing relative rotary movement between the stone and the pulp to produce their separation, although the means for securing the pulp and causing its rotation are deffective and inefficient. The efficiency of a peach pitting operation is judged mainly from a time standpoint and amount of fruit recovered. These factors are of paramount importance. The principle objective of the present invention is to provide a unique method and apparatus that will efficiently recover the greatest amount of fruit in the least possible time. The present invention differs from the prior art for many reasons which will become evident as the description of the present invention unfolds and among which are its continuous operation and its use of a novel elastic, fruit-gripping and rotating means.

Some of the most outstanding advantages of the present invention are the following:

a. Better presentation and appearance of the stone-free fruit halves, due to the separation of the stone from the pulp without the intervention of pulp deteriorating elements or tools, whereby it is possible to vary the force with which the fruit is "held" and thus, adapt the invention to different types of peaches, such as those of the clingstone or free-stone types, as well as, to fruit of different degrees of ripeness;

b. Minimum loss of pulp regardless of its shape or size of the stone;

c. Less possibility of obstruction and longer uninterrupted operation; and d. Lower maintenance costs due to the reduction in the number of moving mechanical parts and to the lack of complex mechanisms.

In accordance with the present invention a peach to be pitted is presented to the apparatus oriented in such manner that its line of separation between its halves is in alignment with two coplanar mounted sharp metallic plates. The plates engage the subject peach and give it a diametrical cut to a depth reaching nearly to the stone and then completely up to the stone whereupon the plates grasp the stone and hold it securely during the ensuing pitting operation. The next step is to simultaneously and uniformly grasp about two-thirds of the external semi-spherical area of each half and then rotate the two halves, for example 180° about their own axis, in opposite directions, maintaining the stone centered and stationary between the metal plates. The grasping of each half of the fruit is achieved by means of the novel elastic gripping means of the present invention and comprises a diaphragm adapted to contact, due to the effect of a fluid acting thereon, a fruit half with a force sufficient to transmit a rotation to the fruit.

As the two halves rotate, and because the stone is firmly held between the two plates, the pulp around it separates from the stone due principally to the different consistency between the wood of the stone and the soft tissues of the pulp, with the separation being effected with minimum tearing of the pulp in its zone of adhesion to the stone. This result is achieved by the combined effect of the rotation and the favorable pressure distribution, generally uniform, applied over the external surface of each half, (regardless of its profile) by the elastic gripping means.

Following this, the two de-stoned or pitted halves are freed, by disengaging the gripping means and the stone is freed by separating the metal plates.

This complete operation as described above is effected by means of a unique combination of mechanical movements operated by a pneumatic or hydraulic system conceived for this machine, and the operation can be continuous, using an automatic feeder or manual feeding.

In the preferred embodiment, the apparatus consists of a rotating plate on which are defined four stations. As each station passes by a feeding station, it receives a peach which is split and de-stoned and afterwards discharged at a discharge station. The inventive combination allows continuous operation, with its consequential advantages. More specifically, the preferred machine consists of a central rotor incorporating a plate with two pairs of diametrically opposed operating stations, determined by eight sectors, four of which are fixed to the plate and four movable with respect thereto with an angular, coplanar movement, thus determining the variation of the aperture of said operating stations. Furthermore, two lateral supports are provided, one on each side of the plate, carrying four pairs of elastic gripping devices, each pair of which is made to move simultaneously and in opposite directions with alternative linear movement oriented perpendicularly to the plate and coinciding with a preselected indexing relative to one of the operating stations. As the elastic gripping devices reaching their closest approach to the plate, a compressed fluid, such as air, simultaneously enters an interior chamber of each gripping device, by means of a charge-discharge valve incorporated into the body of the same, causing the elastic and concave zone of the front wall of the gripping device to deform outwardly, adapting itself with sufficient force to the external surface of the peach half. This deformed condition is maintained during a portion of the rotation of the gripping devices about the common equidistant axis of rotation of the plate and during which both gripping devices rotate approximately ⅜ of a complete turn in opposite directions about their own central axis of rotation. Subsequently, the compressed air is discharged by means of the same valve and the gripping devices are caused to separate, whereby the peaches halves are freed and discharged. The stone or pit is transported to the stone discharge zone where it is freed by the operation station, which is opened, and consequently the stone falls out by gravity or is extracted by a rotary fork synchronized with the plate rotation. This fork sweeps both sides the sectors defining the operating station. Rotation of the plate continues into the loading zone in which a fruit loading device, synchronized with the passage of each operating station, describes an arched to and fro trajectory or path, in such a manner that one of the dead ends of its path coincides with the trajectory or path of said operating stations.

It is obvious that the number of operating stations defined on the plate, as well as the number of sectors and the number of elastic gripping devices, may be varied without departing from the fundamental features of the present invention, such variation principally aimed at changing the operative speed.

BRIEF DESCRIPTION OF THE DRAWINGS

In order to facilitate the best comprehension of the present invention, a specific preferred embodiment will now be described with reference to the accompanying drawings, wherein:

FIG. 2 is a schematic view, partially in vertical plan and partially in vertical section, showing a group of the components of the machine illustrated in FIG. 1;

FIG. 3 is a vertical sectional view across a gripping mechanism of the machine of the present invention;

FIG. 4 is a section along line 4—4 shown in FIG. 3.

DESCRIPTION OF THE PREFERRED EMBODIMENT

Figure 1:
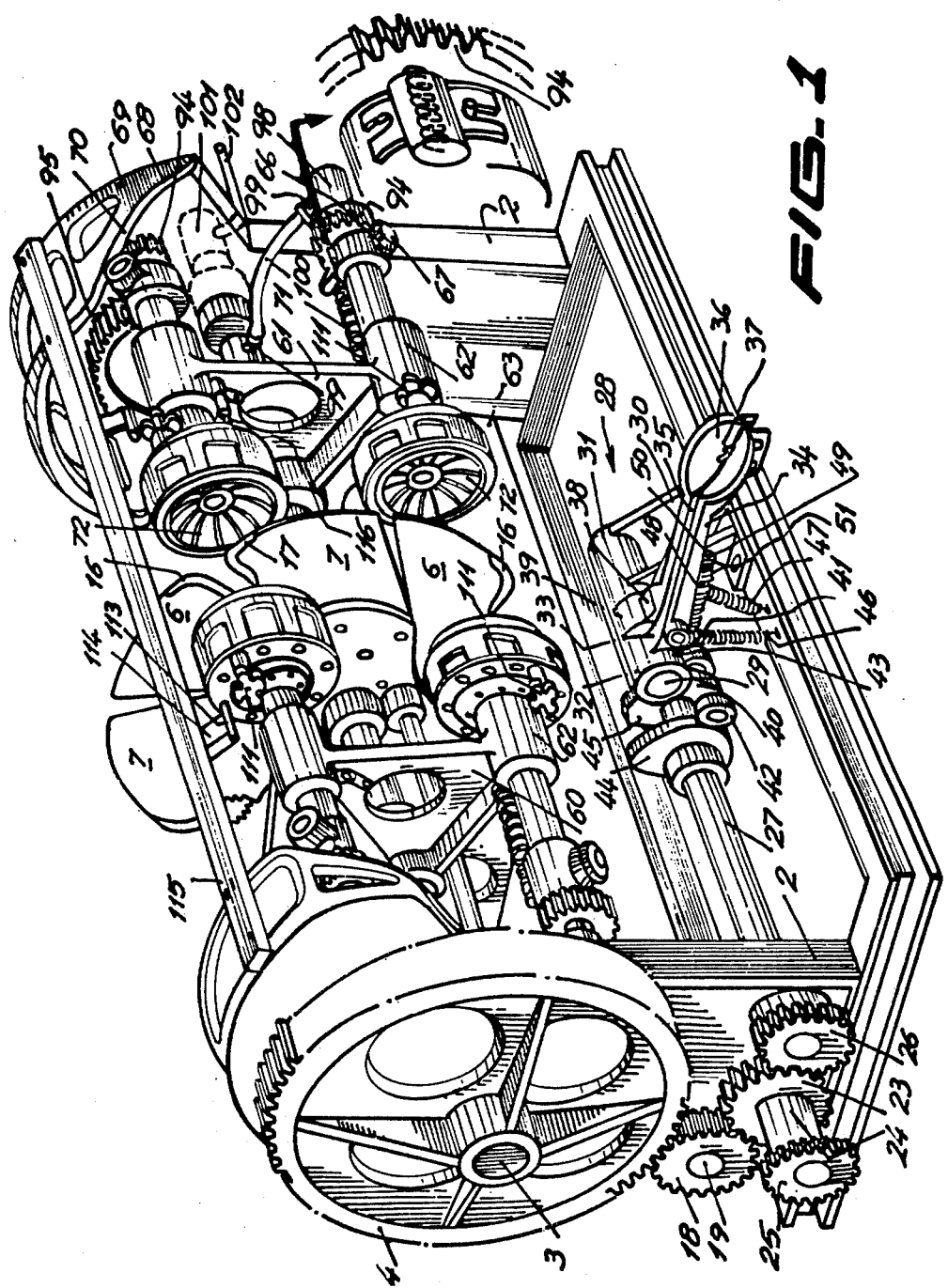
FIG. 1 is a view in perspective of a machine incorporating the novel features of the present invention.

The apparatus illustrated in the drawings comprises a main frame 1 having parallel vertical end frames 2 supporting the apparatus components. These frames 2 support a bearing mounted main shaft 3, fitted to which, outside the space defined between supports 2, is a main gear wheel 4 which receives and transmits to the mentioned shaft all driving motions. A plate 5 is mounted on shaft 3. The former is fitted with four gripping and cutting elements, only two of which have been shown and identified with reference 6. These elements 6 are fixed to plate 5 by means, for example, such as bolts. Furthermore, plate 5 serves as support to four shafts (only two have been shown and identified by reference 8) which can rotate with respect to the plate 5 and on which are mounted, without any capacity for rotation or displacement, the four cooperating respective cutting and gripping devices 7 only, two of which are shown and identified.

Obviously, the apparatus will consist of four of these groups composed of the gripping and cutting elements 7 and 6, and their associated components, equidistantly distributed over plate 5. Notwithstanding that from now onwards reference will be made to only one gripping and cutting group 7-6, the description applies to each one of the four groups included in the apparatus. Shaft 8, on which is fixed the gripping and cutting element 7, extends perpendicularly to plate 5 and also has one end of a radial lug 9 fixed on it with the other end of lug 9 connected to a spring 10 whose other end (not visible) is secured to plate 5, in such manner that the mentioned spring 10 causes the angular movement of lug 9 and that of shaft 8 in a clockwise rotation (FIG. 2). Shaft 8 also has fixed on it one end of another radial lug 11 at whose other end is mounted a follower wheel 12 riding on cam 13, integral or fixed to frame 1 in such manner that cam 13 will cause wheel 12, lug 11 and shaft 8 to rotate (counter clockwise) against spring 10 at the opportune movement, during rotation of plate 5 whereupon cutting element 7 will move counter clockwise with respect to cutting element 6, thereby increasing the size of the space defined between toothed surfaces 14 and 15 defined on elements 6 and 7 respectively. It is in this space, as will be explained later, that the peach stone is imprisoned and held by elements 6 and 7. The cutting and gripping elements 6 and 7 besides being provided with toothed portions 14 and 15 whose configuration is similar to that illustrated so as to increase their capacity to retain the peach stone, are provided with cutting edges 16, 17, the purpose of which will be explained later on.

Referring once again to FIG. 1, it will be appreciated that main gear wheel 4 is driven by pinion 18 mounted on shaft 19 to which is fixed a fork 20 (FIG. 2) which for that reason rotates synchronized with plate 5. This fork 20 has each one of its two tines placed, during part of its rotation, at each side of plate 5 and is synchronized in such manner as to sweep past toothed portions 14 and 15 after these have separated, so as to free the stone previously retained by them. Shaft 19 is supported by a bearing 21, in its turn mounted on support 22 integral with or fixed to main frame 1.

Pinion 18 is driven by pinion 23 pinned to a shaft 24, on which in turn is pinned gear 25 driven from an external power source by any known conventional means. Pinion 23 drives pinion 26 pinned to shaft 27 which commands or drives peach feeding mechanism 28.

This feeding mechanism 28 includes a shaft 29 supported by arm 30 and bearing 31. This shaft 29 rotatably supports a first bushing 32 having a salient 33 to which are articulated two arms 34 and 35, whose ends define, in combination, a half cup 36 divided into two spaced parts to enable it to be fitted into the spaces defined in plate 5, by gripping and cutting elements 6 and 7, when cup 36 is taken from its illustrated position in which it receives a peach, to a position in which it delivers the fruit to plate 5 placing the stone of the peach between toothed portions 14 and 15. Through the space defined between the two portions of the half cup 36, there extends a guiding tongue 37 supported by a pivoting arm 38 integral with or fixed to bushing 39 mounted on shaft 29.

Bushings 32 and 39 are integral with or fixed to bracing arms 40 and 41, in whose end portions are mounted the cam followers 42 and 43 in contact with cams 44 and 45 mounted on axle 27.

A spring 46 under tension placed between arm 34 and main frame 1 biases cam follower 42 to follow the profile of cam 44.

Similarly, a spring 47 under tension placed between arm 38 and main frame 1 biases cam follower 43 to follow the profile of cam 45.

In addition, a compensating spring 48, and a guiding and regulating threaded pin 49 with nuts 50 have been provided in order to regulate the angular position of arm 34 in respect to bushing 32. To that effect, this adjusting assembly 48, 49, 50 is mounted between a lug 51 (FIG. 2) fixed to arm 34 and a lug (not shown) integral with or fixed to bushing 32 or with the salient 33.

Referring once again to FIG. 1, it may be appreciated that on shaft 3, are mounted, fixed to it, two rigid structures 60, 61 each one of which is provided with the respective housings for supporting bushings 62. Each supporting bushing 62 supports a gripping assembly 63 which is shown in more detail in FIG. 3.

Each gripping assembly 63 includes a hollow rotary central shaft 64 mounted inside a longitudinally sliding shaft (non-rotary) 65. The sliding shaft 64 is fixed to a pin 67 which rotatably supports a cam follower 66.

As will be described in detail later, rotation of shaft 3 causes the gripping assemblies 63 to rotate round the axis of shaft 3, due to which, the cam followers 66, will come into contact, during part of their run with the respective face 68 of cams 69, each one fixed with its associated end frame 2 on main frame 1. Due to the configuration of the cam face 70 of each cam 69, each cam follower 66 will cause or force its respective gripping assembly 63 to approach plate 5. A return spring 71 is provided in order to bias return of the gripping assembly 63 to its initial position once cam follower 66 ceases to contact the cam face 68. The two cam surfaces of cams 69, 69 face each other and are oriented to cause the approach of two facing gripping assemblies at the proper time.

On each shaft 64 is mounted a gripping head composed of an elastic concave grooved or ridged rubber diaphragm 72, tightened against a cylindrical body 73 by means of a rustless metallic cover 74, held by screws (only their axis 75 being illustrated). The surface of the diaphragm which establishes contact with the fruit, although preferably grooved or ridged, may be ungrooved or unridged if the material of which it is made adheres sufficiently to the fruit. The gripping head is joined to shaft 64 through a metal disc 76 peripherically secured to cylindrical body 73 by means of screws (also only shown by their axis 77) and in its central body by means of screws 80 which run through the body of valve 78.

The body of valve 78 has a recess, dimensioned in a manner such as to receive disc 79, mounted on stem 82 which runs through the body of valve 78 and a complementary body 84 between which a recess 91 has been cut and which defines part of a passage for air, to be described later. Another recess 85 is defined in complementary body 84, in which there is lodged a hermetic seal 86 which embraces stem 82. Disc 79 serves to detect the presence of a peach, illustrated by a dotted line on FIG. 3 and to open the air passage 91 which will now be described.

On the internal end of stem 82 is located a disc valve 87 fixed with the former and against which a spring 88 is supported and located inside a bore 89 defined in axle 64. Normally, disc valve 87 is seated against face 90 of valve body 78 thus obstructing passage 91 which is mentioned above and which is located between complementary body 84 and valve body 78.

Passage 91 is circumferential and surrounds stem 82 so that it is permanently in communication with conduit 92, defined in a radial projecting portion 93 of shaft 64.

Shaft 64 presents on its free end a gear wheel 94 firmly keyed to the same and capable of engaging recess 95, 96 which are crown wheel sectors mounted rigidly on lateral supports 2. Shaft 64 besides being provided with bore 89 presents a central passage 97 which communicates therewith as well as with a rotary air valve 98 communicated with shaft 3 which is hollow in this section by connectors 99 and hose 100.

The hollow portion of shaft 3 is in turn connected to a rotary air valve 101, similar to valve 98. This valve 101 is connected to an air source (not illustrated) by means of tube 102.

Returning now to FIG. 3, passage 92 is in permanent communication with a valve 103 designed to allow the synchronized inlet and outlet of air to chamber 104 defined between diaphragm 72, cylindrical body 73 and metal disc 76.

This valve 103 incorporates a body 105 fixed to disc 76 in a peripherical portion thereof, coinciding with bore or aperture 107 defined in shaft 106. In front of this bore or aperture 107, the wall of cylindrical body 73 has a reduction in thickness, which jointly with the mentioned bore or aperture 107 defines a passage which ends in chamber 104. Body 105 houses shaft 106 free to rotate inside the former and which is provided, as noted, on one end with central axial bore or aperture 107 which in turn connects with two radial diametrically opposed bores 108. These radial bores 108 communicate with passage 109 defined in body 105, which in turn communicates with passage 92.

The axial central bore 107 has on its blind end a communication with two radial bores 110 placed at 90° with respect to radial bore 108. Radial bores 110 communicate, when shaft 106 is in the correctly aligned position, with the atmosphere or ambient. Communication with and closing of passage 109 by means of radial bores 108 and of the two bores 110 with the atmosphere, is obtained by rotating shaft 106. For this purpose, shaft 106 has mounted on its other end a member 111 substantially in the form of a Maltese Cross which defines recesses 112. During a portion of the rotation of gripping assembly 63 around shaft 3, a spigot or rod 113 fixed on arm 114 fixed in turn to transverse bar 115 mounted between lateral end frames 2 will be received in the recesses 112 causing rotation of member 111. The spigot 113 serves to establish a communication between passage 92 and chamber 104. Communication of chamber 104 with the atmosphere is affected by means of pin 116, mounted on support 117 fixed to structure 61. This pin 116 is likewise located in the trajectory which recesses 112 describe round shaft 64.

OPERATION OF THE PREFERRED EMBODIMENT

An automatic feeder or an operator, places a peach in cup 36, oriented with its bisecting line coinciding with guiding tongue 37 and anchored thereto by its peduncle portion. This operation is carried out during the travel of cam followers 42, 43 over the constant diameter portion of cams 44 and 45 while these cams rotate being driven by shaft 27 which in turn is made to rotate by pinion 23, shaft 24 and pinion 25 connected to the driving source (not shown). During this period, cup 36 is stationary, thus facilitating its loading.

When the eccentric surfaces of both cams 44, 45 act on their respective followers, cup 36 will describe an arc accompanied by guiding tongue 37 which reaches the periphery of plate 5, from which point only cup 36 continues in motion, introducing the peach exactly into an aperture defined between plates 6 and 7, whose cutting edges 16 and 17 produce the diametrical cut of the peach pulp, cup 36 reaching its maximum travel the instant in which the center of the fruit reaches toothed zone 14, 15 of the aperture. Thereafter, cap 36 returns towards its position shown in FIG. 1, the peach remaining in position in plate 5, which is rotating, with the peach stone "C" (FIG. 3) lodged between the toothed edges 14, 15 of the aperture. Then follower wheel 12 is drawn or runs over the surface of cam 13 producing counter clock-wise angular displacement of the gripping and cutting element 7, not only to permit the loading of the peach but to allow the discharge of the prior stone as well.

For fruits in which the stone is of a large dimension, arms 34, 35 of cup 36 are articulated on a pin to salient 33 so that the difference in the travel distance of cup 36 is absorbed by compensating spring 48. Furthermore, the tension of this spring and the end point of maximum stroke may be regulated by nut 50 on regulating assembly 49.

When cup 36 and guiding tongue 37 retreat, due to the action of springs 46 and 47, respectively, the peach remains seized between gripping elements 6 and 7. Immediately after follower wheel 12 leaves contact with cam 13 and, as a result of the action of spring 10 on lug 9 of axle 8, plate 7 is forced towards plate 6, firmly gripping the stone between toothed surfaces 14 and 15. This condition then persists during the rotational travel of the plate 5 during which the de-stoning action occurs which will now be described.

Simultaneously with the rotation of plate 5 and once the peach has been fed into it, the two opposite gripping elements 63 will approach each other and engage the peach halves when the cam followers 66, which are mounted on the gripping elements and which ride on cams 68 are moved toward each other by cams 68. At this time each half of the peach will be received inside one of the concave diaphragms 72 located to one side of plate 5.

At that moment, valve 103 is operated by spigot 113, admitting compressed air into chamber 104. It will be noted that chamber 104 will be connected with the central passage 97 of shaft 64 through disc valve 87, 90 (which has already been opened when the half-peach was located in the concave cavity of diaphragm 72 due to the fruit depressing disc 79 and stem 82 against the bias of compressing spring 88) and thus, air under pressure, from its source (not shown) will be in communication directly from the source to chamber 104. The air pressure acts evenly over the internal surface of diaphragm 72, which adapts itself to the shape of the half-peach holding it firmly.

In the case that no peach is fed into the machine, there will be no action on or depression of feeler disc 79 of valve 87, 90 for which reason disc 87 will remain seated against its seat 90 due to the action of spring 88, blocking the passage of air to valve 103 and consequently to chamber 104 of diaphragm 72.

On reaching this condition of the peach halves being firmly gripped by devices 63, facing heads 63 start on inverted rotary motion due to the respective meshing of pinions 94 with the toothed sectors 95, 96 (pinions 94 are fitted with a spot brake illustrated in the detail in FIG. 1. This brake is of a well-known type so that it will not be described in detail although it should be noted that by means of the same, pinions 94 always find themselves in the same position on leaving and coming into contact once again with toothed sectors 95, 96). As the peach has already been diametrically cut, the torsion originated or created by pinion 94 and toothed sectors 95, 96 only acts to unstick the pulp from the stone which is being firmly held between the teeth 14, 15 of plates 6 and 7.

When each one of the mentioned heads 63 has rotated ⅔ of a turn about its own axis, the respective valves 103 actuate on meeting the corresponding pins, stops or plungers 116, communicating chambers 104 of diaphragms 72 with the atmosphere, causing the discharge of air pressure; simultaneously, cam followers 66 run over a depression on the faces of cams 68, and cause a partial separation or withdrawal of the gripping heads, ceasing or eliminating their adhering or gripping action on the peach halves until pinions 94 abandon toothed sectors 95, 96 completing thus one full turn.

At the end of the rotation of heads 63, the final separation commences as a result of cam followers 66 moving over the final run of cams 68 under the biasing influence of return spring 71, leaving at that time the two peach halves free, which then drop due to gravity. At that moment the follower wheel 12 will once again come into contact with cam 13 producing the separation of plates 6 and 7 by action of spring 10, freeing the peach stone which will also drop due to gravity. This condition between the mentioned plates is maintained until feeder assembly 28 has once again placed a peach between them restarting the sequence.

In the event that the stone remains stuck when the plates separate, it will be freed by rotary fork 20, synchronized with plate 5. Fork 20 will sweep over the opposite faces of plate 5 sweep any caught stone peripherally outwardly leaving the resulting aperture between toothed surfaces 14 and 15 free to accept the next peach and to renew operations.

Although in the described embodiment, reference has been made to the use of air as the power supply to cause diaphragm 72 to grip the fruit half, it is possible to use another medium such as another gas or even a liquid whereby the power supply may be either pneumatic or hydraulic.

It will be understood that improvements and modifications may be introduced in the embodiment described by way of example, without departing from the scope of the invention specifically defined in the following claims.

What is claimed is:

1. Method for parting or bisecting and de-stoning fruit such as peaches comprising the steps of
receiving a fruit and producing a cut partially through its pulp thus defining two adhered pulp halves,
gripping the stone of the fruit,
rotating the partially cut fruit, gripped by its stone about a first axis spaced from said fruit,
resiliently gripping both halves of the fruit pulp by engaging the outer surface of each half with a flexible diaphragm which is deformed into gripping engagement by the application of compressed fluid thereagainst;
rotating the resiliently engaged halves in opposite directions about a center axis extending through both said fruit halves during a predetermined rotation about said first axis until the freeing of both halves, one with respect to the other, and of both halves from the stone, while the stone remains gripped,
releasing the freed halves responsive to a predetermined rotation about said first axis, and
releasing the stone responsive to a predetermined rotation about said first axis.

2. Method according to claim 1 wherein the step of gripping both halves is effected pneumatically.

3. Method according to claim 1 wherein the step of gripping both halves is effected hydraulically.

4. Method for parting or bisecting and de-stoning fruit such as peaches comprising the steps of receiving a fruit, producing a cut partially through its pulp thus defining two adhered halves, gripping the stone of the fruit while rotating the fruit about a first axis spaced from the fruit, pneumatically gripping both halves of the fruit by resiliently engaging their surfaces, rotating the resiliently engaged halves in opposite directions about their center axis during a predetermined rotation about said first axis until the freeing of both halves, one with respect to the other, and of both halves from the stone, while the stone remains gripped, supplying compressed fluid against means engaging the fruit surfaces to effect the pneumatic gripping, valving the compressed fluid supply to render the pneumatic gripping effective responsive to fruit being received and to a predetermined rotation about said first axis, and releasing of the fruit halves and the stone responsive to a predetermined rotation about said first axis.

5. Method according to claim 4 wherein the pneumatic gripping occurs after the fruit has been rotated about the first axis by a predetermined amount.

6. Method for parting or bisecting and de-stoning fruit such as peaches comprising the steps of receiving a fruit at a first station in a closed work path, having an axis spaced from the fruit, producing a cut partially through its pulp thus defining two adhered halves, gripping the stone of the fruit while rotating the fruit along said work path to a second station, pneumatically gripping both halves of the fruit by resiliently engaging their outer surfaces by supplying compressed fluid to means engaging the fruit surfaces at said second station along said work path, advancing said resiliently engaged halves to a third station along said work path whereat they are rotated in opposite directions about their center axis until the freeing of both halves, one with respect to the other, and of both halves from the stone, while the stone remains gripped, advancing said freed but resiliently engaged halves along said work path to a fourth station whereat they are released to fall out of the work path to a collection point, and releasing the stone prior to completing a full cycle of the work path.

7. A method for parting or bisecting and de-stoning fruit such as peaches comprising the steps of receiving a fruit and producing a cut partially through its pulp to define two adhered pulp halves, gripping the stone of the fruit, resiliently gripping both pulp halves of the fruit by engaging the outer surface of each half with a flexible diaphragm deformed by the application of compressed fluid thereagainst, rotating the resiliently engaged halves in opposite directions about a center axis extending through both said fruit halves until the freeing of both halves, one with respect to the other, and of both halves from the stone while the stone remains gripped, releasing the freed halves from said resilient gripping, and releasing the stone.

* * * * *